US008605650B2

(12) United States Patent
Wiatrowski et al.

(10) Patent No.: US 8,605,650 B2
(45) Date of Patent: Dec. 10, 2013

(54) SYSTEM AND METHOD FOR INTERRUPTING A TRANSMITTING DEVICE IN A COMMUNICATION SYSTEM

(75) Inventors: David G. Wiatrowski, Woodstock, IL (US); Thomas B. Bohn, McHenry, IL (US); Dipendra M. Chowdhary, Hoffman Estates, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1290 days.

(21) Appl. No.: 12/136,177

(22) Filed: Jun. 10, 2008

(65) Prior Publication Data

US 2009/0303923 A1  Dec. 10, 2009

(51) Int. Cl.
*H04W 4/00* (2009.01)

(52) U.S. Cl.
USPC .................................. 370/328; 455/422.1

(58) Field of Classification Search
USPC ........................................................ 370/328
See application file for complete search history.

(56) References Cited

U.S. PATENT DOCUMENTS

| 5,091,906 | A | 2/1992 | Reed et al. | |
| 6,584,114 | B1 * | 6/2003 | Flake et al. | 370/437 |
| 7,082,108 | B2 * | 7/2006 | Hwang et al. | 370/311 |
| 7,333,824 | B2 * | 2/2008 | Zhang et al. | 455/502 |
| 7,352,709 | B2 * | 4/2008 | Wakabayashi | 370/278 |
| 2001/0044322 | A1 | 11/2001 | Raaf | |
| 2003/0109253 | A1 * | 6/2003 | Fenton et al. | 455/422 |
| 2003/0117980 | A1 * | 6/2003 | Kim et al. | 370/332 |
| 2003/0152044 | A1 | 8/2003 | Turner | |
| 2007/0206533 | A1 * | 9/2007 | Wiatrowski et al. | 370/329 |
| 2008/0167062 | A1 | 7/2008 | Gilbert | |
| 2009/0258664 | A1 * | 10/2009 | Huan | 455/522 |
| 2009/0303923 | A1 * | 12/2009 | Wiatrowski et al. | 370/328 |

FOREIGN PATENT DOCUMENTS

GB  2358557 A  7/2001

OTHER PUBLICATIONS

PCT Search Report Dated Dec. 30, 2009.
C. Cordeiro, et al. "An Introduction to the 3-6 First Wireless Standard Based on Cognitive Radios", Journel of Communications, Academy Publishers, Oulu, FI; vol. 1, No. 1, Apr. 1, 2006; p. 38-47; XP002486875; ISSN:1796-2021.
"Terrestrial Trunked Radio (TETRA); Technical Requirements for Direct Mode Operation (DMO); Part 3: Mobile Station to Mobile Station (MS-MS) Air Interface (AI) Protocol; Final Draft ETSI EN 300 396-3", ETSI Standards, LIS, Sophia Antipolis Cedex, France; vol. TETRA, No. V1.3.0; Apr. 1, 2006; XP014033803, ISSN:0000-0001.
EPC Supplementary European Search Report Dated Sep. 8, 2011.

(Continued)

*Primary Examiner* — Guang Li
(74) *Attorney, Agent, or Firm* — Terri H. Smith; Daniel R. Bestor

(57) ABSTRACT

A system and method for interrupting a transmitting device during a call. In the system, calls are transmitted from a first device on a communication channel as a series of channel frames. At predetermined times during the transmission, the transmitting device is configured to drop channel frames, resulting in open channel frame periods where the transmitting device is not transmitting on the communication channel. During these open channel frame periods, the transmitting device is also configured to switch to a receiving mode. Other devices in the system are capable of switching into a transmitting mode during the open channel frame periods and, when applicable, sending an interrupt request on the communication channel to the transmitting device in order to request access to the channel.

20 Claims, 12 Drawing Sheets

(56) References Cited

OTHER PUBLICATIONS

International Preliminary Report on Patentability for International Application No. PCT/US2009/045563 dated Dec. 13, 2010.
Supplementary European Search Report for European Patent application No. 09763266.5 mailed on Sep. 16, 2011.
"Terrestrial Trunked Radio (TETRA); Technical Requirements for Direct Mode Operation (DMO); Part 3: Mobile Station to Mobile Station (MS-MS) Air Interface (AI) protocol; Final Draft ETSI EN 300 396-3", ETSI Standards, vol. TETRA, No. V1.3.0, Apr. 1, 2006.
Cordeiro C et al., "An Introduction to the First Wireless Standard based on Cognitive Radios", Journal of Communications, vol. 1, No. 1, Apr. 1, 2006, pp. 38-47.

* cited by examiner

SYSTEM AND METHOD FOR INTERRUPTING A TRANSMITTING DEVICE IN A COMMUNICATION SYSTEM

TECHNICAL FIELD OF THE DISCLOSURE

This disclosure relates generally to communication systems, and more particularly, to a system and method for interrupting a transmitting device in a communication system.

BACKGROUND OF THE DISCLOSURE

Wireless communication systems (e.g., time division multiple access (TDMA) systems, frequency division multiple access (FDMA) systems, or the like) generally comprise a set of radios and a set of base stations. The radios, which may be mobile radios, portable radios or the like, are generally the endpoints of a communication path, while base stations are typically stationary intermediates by which a communication path to a radio device is established or maintained.

When a subscriber is transmitting communications, there may be instances when interrupting the transmitting subscriber may be important. For example, a first police officer needing back up may need to interrupt a second police officer that is engaged in a call. In such an instance, it would be important to have a mechanism to interrupt the second police officer to notify the second officer that the first police officer requires assistance.

Accordingly, there is a need for interrupting a transmitting subscriber/device in a communications system.

BRIEF DESCRIPTION OF THE FIGURES

Various embodiment of the disclosure are now described, by way of example only, with reference to the accompanying figures.

DETAILED DESCRIPTION OF THE DISCLOSURE

The present disclosure provides a system and method for interrupting a transmitting device during a call. In accordance with this disclosure, calls are transmitted from a first device on a communication channel as a series of channel frames, which may be, for example, a series of bursts in a TDMA system, a series of payload frames in an FDMA, and the like. At predetermined times during the transmission, the transmitting device is configured to drop channel frames, resulting in open channel frame periods where the transmitting device is not transmitting on the communication channel. During these open channel frame periods, the transmitting device is also configured to switch to a receiving mode.

Other devices in the system, such as any radios or base stations receiving the call, are then capable of ascertaining the timing of the open channel frame periods and switching into a transmitting mode during the open channel frame periods. If another device in the system needs to interrupt the transmitting device, that other device is configured to send an interrupt request on the communication channel to the transmitting device in order to request access to the channel. Upon receiving the interrupt request, the transmitting device ceases or pauses transmission, allowing the other device to then begin transmitting a new call on that same communication channel.

Figure 1:
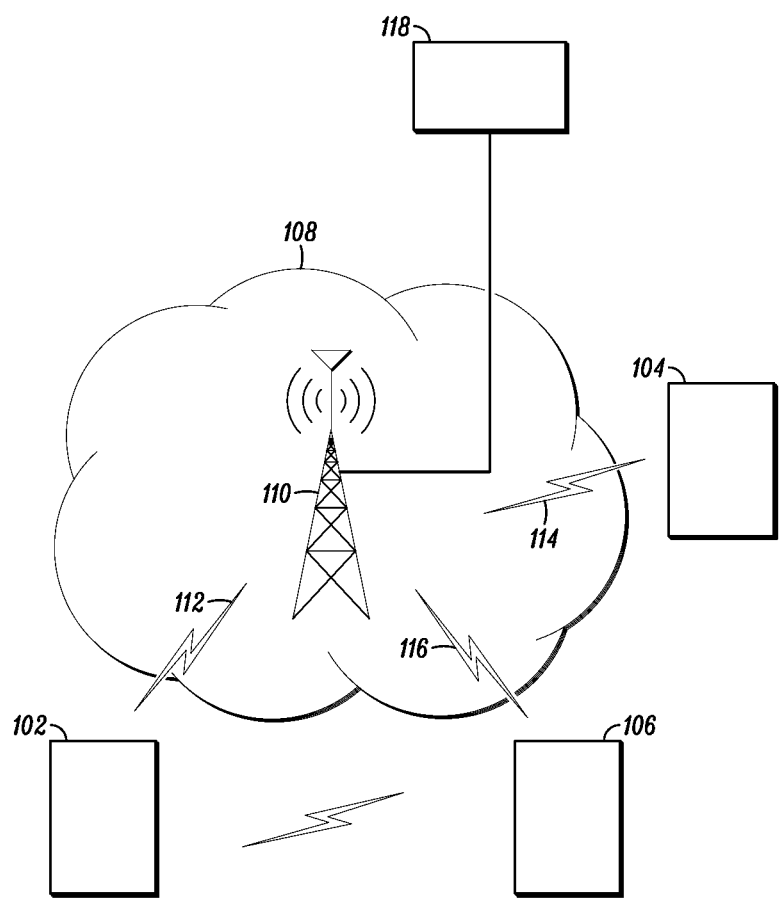
FIG. 1 illustrates an example of a communication system in accordance with an embodiment of the present disclosure.

Let us now discuss the present disclosure in greater detail by referring to the figures below. FIG. 1 illustrates an exemplary communication system 100 that may be used for implementing the present disclosure. Communication system 100 comprises mobile communication devices 102, 104, and 106, which may be for example, portable or mobile radios, personal digital assistants, cellular telephones, video terminals, portable computers with a wireless modem, or any other wireless devices. For purposes of the following discussions, the communication devices may be referred to as "radios", but they are also referred to in the art as subscribers, mobile stations, mobile equipment, mobiles, portables, handsets, etc.

Radios 102, 104, and 106 communicate over a radio access network 108 via wireless communication resources. Of course, those of ordinary skill in the art will realize that any type of network is within the scope of the teachings herein.

Thus, the radio access network 108 may comprise infrastructure such as, but not limited to, base stations (with a single base station 110 shown for clarity), base station controllers (not shown), network elements (such as a mobile switching center, home location register, visitor location register, etc.), and the like, to facilitate the communications between radios having access to the radio access network 108. As shown in FIG. 1, base station 110 may also be configured to communicate with one or more dispatch console sites 118.

The wireless communication resources used for communication between the base station 110 and radios 102, 104, and 106 may include any type of communication resource such as, for example, radio frequency (RF) technologies, including, but not limited to TDMA; Code Division Multiple Access (CDMA), FDMA, Orthogonal Frequency Division Multiple Access (OFDMA) and the like. Other wireless technologies, such as those now known or later to be developed and including, but not limited to, infrared, Bluetooth, electric field, electromagnetic, or electrostatic transmissions, may also offer suitable substitutes.

In the illustrated communication system 100, radios 102, 104, and 106 may communicate with one another either in "repeater mode" or in "direct mode." In repeater mode, the radios 102, 104, and 106 may communicate with each other by radio 102 establishing a wireless link or radio connection 112 with base station 110 over an available RF channel, radio 104 establishing a wireless link 114 with base station 110 over an available RF channel, and radio 106 establishing a wireless link 116 with base station 110 over an available RF channel. As is well understood in the art, base station 110 comprises one or more repeater devices that receive a signal from one of the radios 102, 104, or 106 over the respective link 112, 114, or 116 and retransmit the signal to one or more of the other radios. Communication from a radio 102, 104, or 106 to base station 110 are generally referred to as being inbound while communications from base station 110 to a radio 102, 104, or 106 are generally referred to as being outbound.

As also shown in FIG. 1, in direct mode (also commonly referred to as talkaround mode), radios (e.g., radios 102 and 106) may communicate directly, without a base station, by establishing a wireless link with one another. As will be understood from the discussions below, the present disclosure is equally applicable to both direct mode communications and communications via base station 110.

Of course, while one embodiment of a communication system is illustrated in FIG. 1, practitioners skilled in the art will appreciate that the system 100 may also include various other elements not shown in FIG. 1. For example, while only three radios and one base station is shown for ease of illustration, those skilled in the art will realize that in a typical system a much larger number of radios are supported by a radio network. The system 100 may also include many more base stations than is shown in FIG. 1.

One exemplary embodiment of the present disclosure is illustrated in FIGS. 2-10. This illustrated embodiment is described with reference to a TDMA system compliant with European Telecommunications Institute (ETSI) standards TS 102 361. However, one skilled in the art should understand that the present disclosure may similarly be applied to other TDMA systems or any other type of communication system that is configured to transmit calls as a series of channel frames. For example, the present disclosure may equally be applied to an FDMA system compliant with ETSI-dPMR standard (ETSI TS 102 490).

Figure 2:
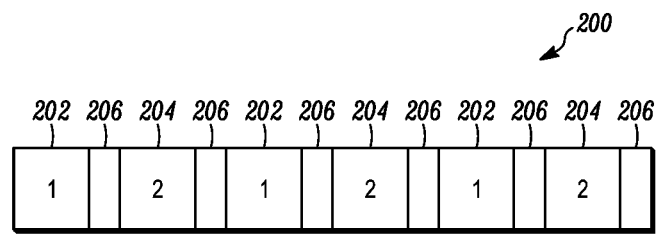
FIG. 2 illustrates a TDMA signal that may be used to transmit call information in the system of FIG. 1 in accordance with an embodiment of the present disclosure.

Turning first to FIG. 2, one exemplary embodiment of a TDMA carrier signal 200 that may be used for transmitting information in accordance with the present disclosure is illustrated. Generally, each TDMA carrier signal 200 is divided into numerous time slots or communication streams. In FIG. 2, the TDMA carrier signal 200 is illustrated having two time slots, labeled respectively as "1" and "2", although it should be understood that a TDMA carrier signal in accordance with the present disclosure could also have any number of time slots, such as 4, 8, 16 or any other potential number of time slots.

Each time slot includes discrete information packets 202 and 204 (also referred to herein as "bursts" or more generically as "channel frames") configured to carry a specific amount of information. As shown in FIG. 2, sub-slots 206 may also be provided between each of the bursts. For outbound signals, the sub-slots 206 typically include a Common Announcement Channel (CACH) signal. For inbound signals, the sub-slots 206 typically provide guard time between bursts.

When calls are initiated, they are assigned to a communication channel. In a TDMA system, the communication channel may be comprised of one or more time slots. For example, when operating in repeater mode, each communication channel may be comprised of one or more time slots for transmitting the call from a radio to the base station (i.e., an inbound channel link), and one or more time slots for transmitting the call from the base station (i.e., an outbound channel link). In direct mode, on the other hand, only one channel link is generally required to transmit the call.

Figure 3:
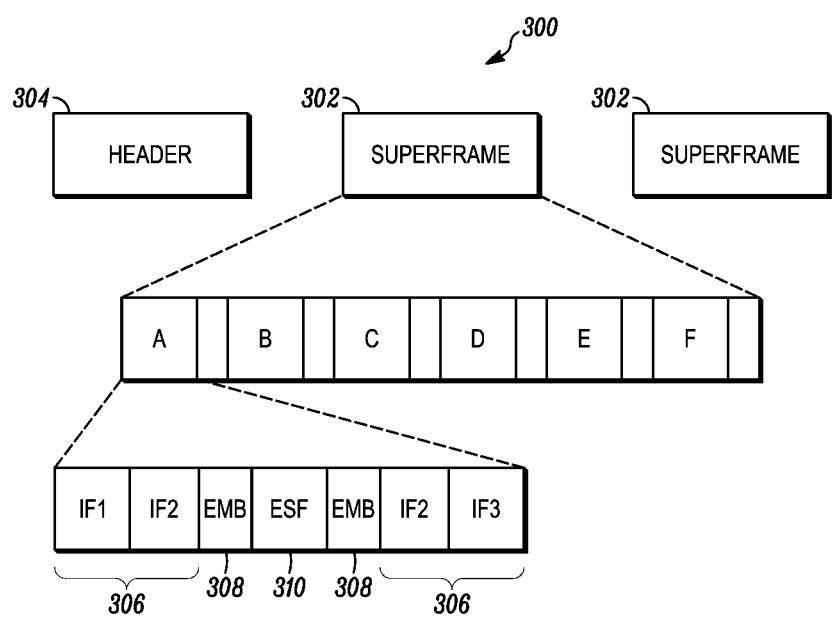
FIG. 3 illustrates a multi-burst call signal structure in accordance with an embodiment of the present disclosure.

FIG. 3 illustrates one example of a multi-burst structure for a TDMA call signal, in accordance with protocols set out in ETSI standard TS 102 361, that may be utilized to transmit call information on a TDMA carrier signal 200. In this embodiment, the TDMA call signal 300 is separated into multiple superframes 302. Each superframe 302 includes six individual bursts A, B, C, D, E, and F, each of which is 27.5 ms in duration. Every 360 ms during a call, this superframe burst sequence is repeated.

Each voice call may also begin with a header 304. The header 304 may include a link control header burst, which may contain information, such as a manufacturer ID, a talkgroup ID, a source ID, and a destination ID. It should also be understood that header 304 may be comprised of multiple header bursts, each containing different types of information.

As further shown in FIG. 3, each burst A-F includes a payload field 306, an EMB field 308 and an embedded signaling field 310. The payload field 306 includes the particular media information being transmitted (i.e., voice, data, control, video, etc.) and is comprised of three information frames: IF1, IF2, and IF3. As can be seen from FIG. 3, the second information frame, IF2, is split into two parts, one on either side of the embedded signaling field 310. When transmitting voice call information, each information frame in bursts A-F corresponds to 20 ms of voice information.

The embedded signaling field 310 may include synchronization and other control data. In one embodiment, the embedded signaling field 310 of burst A includes a voice frame synchronization signal, while the embedded signaling fields of the remaining bursts include Link Control information or other signaling information. Such synchronization and signaling information may be comprised of various information elements as are well known in the art. The EMB field 308 includes information elements that define the meaning of the payload field. For example, in accordance with ETSI standard TS 102 361, the EMB field 308 may include information elements such as color code information, link control start stop (LCSS) bits, a privacy bit, and EMB parity.

In accordance with the present disclosure, a communication device that is in the process of transmitting a call (also referred to as a "transmitting device") is configured to periodically or intermittently drop channel frames (i.e., bursts in a TDMA system or payload frames in an FDMA system) during transmission. Thus, the transmitting device is configured to not transmit a channel frame during a predetermined set of channel frame periods. During these predetermined channel periods, the transmitting device is also configured to switch over into a receiving mode in order to listen for any incoming transmissions. For purposes of this disclosure, a channel period during which a transmitting device does not transmit a frame is referred to as an "open channel frame period." In the case of a TDMA system, an open channel frame period may also be referred to as an "open burst period." Similarly, in the case of an FDMA system, an open channel frame period may also be referred to as an "open payload frame period." It should also be understood that the term "call" is meant to include any type of multimedia transmission, as well as transmissions comprising system control information.

Communication devices that are in the process of receiving the call (also referred to as "receiving devices") may also be configured to switch, when necessary, into a transmitting mode in order to initiate transmissions during an open channel frame period. As will be explained in further detail below, this permits non-transmitting devices in the communication system to send interrupt requests to the transmitting device in order to request use of the channel being utilized by the transmitting device, and permits the transmitting device to receive such interrupt requests while transmitting.

Figure 4:
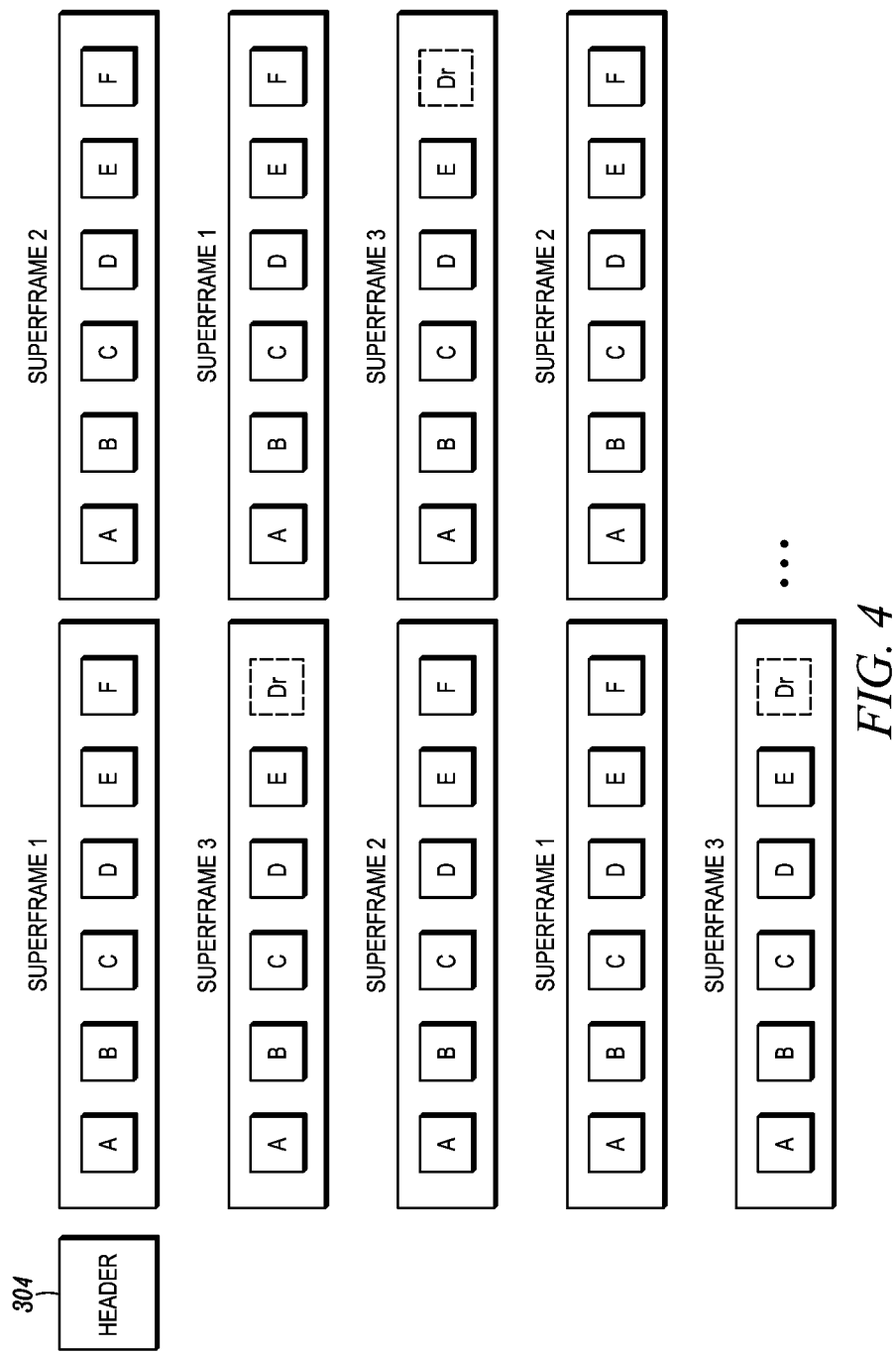
FIG. 4 illustrates a method for transmitting a TDMA call signal in accordance with an embodiment of the present disclosure.

FIG. 4 illustrates one exemplary embodiment for transmitting a TDMA call signal in accordance with the present disclosure. In this embodiment, the transmitting device is configured to drop a burst every third superframe, and more particularly, to drop an F burst during every third superframe. That is, the transmitting device does not transmit the F burst from every third superframe. Each open burst period in FIG. 4 is illustrated using the letters "Dr" to indicate that no burst was transmitted during that burst period. For purposes of this description, each set of three superframes is also identified as superframes 1, 2, and 3, with superframe 3 having the open burst period.

In the embodiment discussed in FIG. 4, the F burst is dropped because, in accordance with the signaling structure described in FIG. 3, the F burst generally includes the least significant control information as compared to other bursts in the superframe. However, it is understood that other bursts in the superframe may also be selected to be dropped. The transmitting device may also be configured to alternate dropping different bursts in the superframes.

It should also be understood that the duration between dropped bursts may be altered as a matter of design choice. Increasing the duration between dropped bursts decreases the amount of call information that is lost from the transmission but also increases the amount of time between opportunities when a non-transmitting device can request access to the channel, and vice-versa. For example, in the embodiment described above for a 2-slot TDMA system, a burst is dropped every third superframe and, therefore, the time between open burst periods is 1080 ms. If the burst is alternatively dropped every sixth superframe, the call quality may be increased but the time between open burst periods would be increased to 2160 ms.

In one exemplary embodiment, the transmitted call signal may also employ signaling to identify the timing of the open burst period. For example, in the embodiment described in FIG. 4, the transmitted link control information may transmit certain information during the superframe prior to the superframe which will provide the open burst period (i.e., superframe 2 in FIG. 4) to indicate that the next superframe will contain an open burst period. The transmitted call signal may also transmit information to indicate that the transmitted signal is utilizing burst dropping in its transmission, which allows receiving devices to determine whether the transmitting device can be interrupted using the process described herein. This is especially useful in a communication system in which only a portion of the devices are configured to operate using the present disclosure. This information may be transmitted during a header burst 304, in the link control information of each burst, or as any other type of message.

One exemplary embodiment of link control message that may be utilized to perform both of the functions in the TDMA system described above is illustrated in FIG. 9. In this embodiment, the link control message 900 includes a service options field 902, which further includes a Burst Dropping (BD) information element 904, and a Penultimate Superframe (PS) information element 906. The BD information element 904 is comprised of a single bit that is set to the value 1 if the transmitting device is dropping bursts while transmitting. The PS information element 906 is also comprised of a single bit that is set to the value 1 during the superframe immediately preceding a superframe having an open burst period (i.e., a superframe 2 in FIG. 4), and set to the value 0 during all other superframes. The link control message 900 may also include a Feature Set ID ("FID") information element 910. The FID information element 910 may include a standard ID if the transmitted call is not using dropping bursts, or may include a proprietary ID if the transmitted call is dropping bursts. In one embodiment, the proprietary ID may be a manufacturer's ID. The remaining information elements illustrated in the link control message are well known and are therefore not discussed in any further detail herein. It should also be understood that this link control message 900 is but one example. Thus, the relevant information elements may be provided in different portions of the link control message 900. Other information elements in the link control message 900 may also be used to provide similar functionality. For example, rather than using a BD information element 904 or FID information element 910, the OPCODE information element 908 may additionally or alternatively be configured to indicate that the transmission is using burst dropping.

Figure 5:
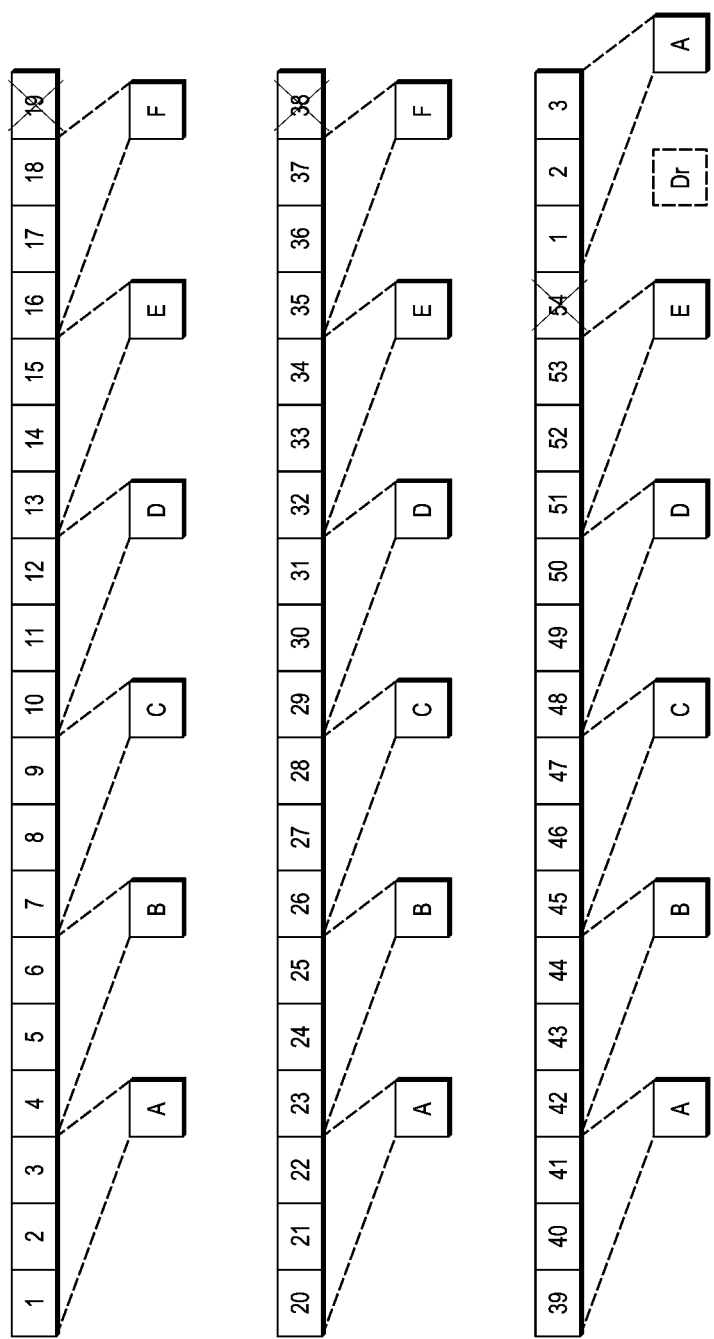
FIG. 5 illustrates a method for generating the TDMA call signal in accordance with an embodiment of the present disclosure.

FIG. 5 illustrates one exemplary embodiment for generating, at a transmitting device, the signaling structure in FIG. 4. In this embodiment, the bursts are generated so as to minimize the impact of the dropped burst on the call quality. As noted above, each burst is comprised of three information frames, each of which is encoded with a predetermined amount of call information (e.g., 20 ms of voice information for voice calls). Thus, the six bursts A-F that make up each superframe are typically comprised of a total of eighteen information frames (e.g., 360 ms of voice information for voice calls). In FIG. 5, fifty-four information frames, numbered 1 through 54, for three consecutive superframes 1-3 are illustrated.

In this embodiment, one information frame is discarded at the end of each superframe. Thus, as shown in FIG. 5, bursts A-F in superframe 1 are generated using information frames 1-18. Information frame 19 is then discarded and bursts A-F for superframe 2 are generated using bursts 20-37. Following superframe 2, information frame 38 is discarded and bursts A-E of superframe 3 are generating using information frames 39-53. Information frame 54 is then also discarded, and the F burst for superframe 3 is dropped (i.e., the F burst is not transmitted, but the channel timing remains intact, thus leaving an open burst period). This process is repeated for each series of three superframes. As a result, the effect of the dropped burst on the quality of a call, and in particular a voice call, is diminished because only a single information frame is lost from each superframe.

Of course, it should be understood that this is only one exemplary method for generating the signaling structure of FIG. 4. For example, any of the information frames may be chosen to be discarded for each superframe. If call quality is not a concern, the communication device may also be configured to simply generate the first two superframes using information frames 1-36, generate the third superframe using information frames 37-51, and then discard information frames 52-54.

To enable seamless generation of bursts while discarding certain information frames, the call information may also be buffered by a predetermined amount of time prior to initiating transmission. For example, in the embodiment described above in which three 20 ms information frames are to be discarded every three superframes, it would be desirable to provide at least a 60 ms buffer before initiating transmission.

Figure 6:
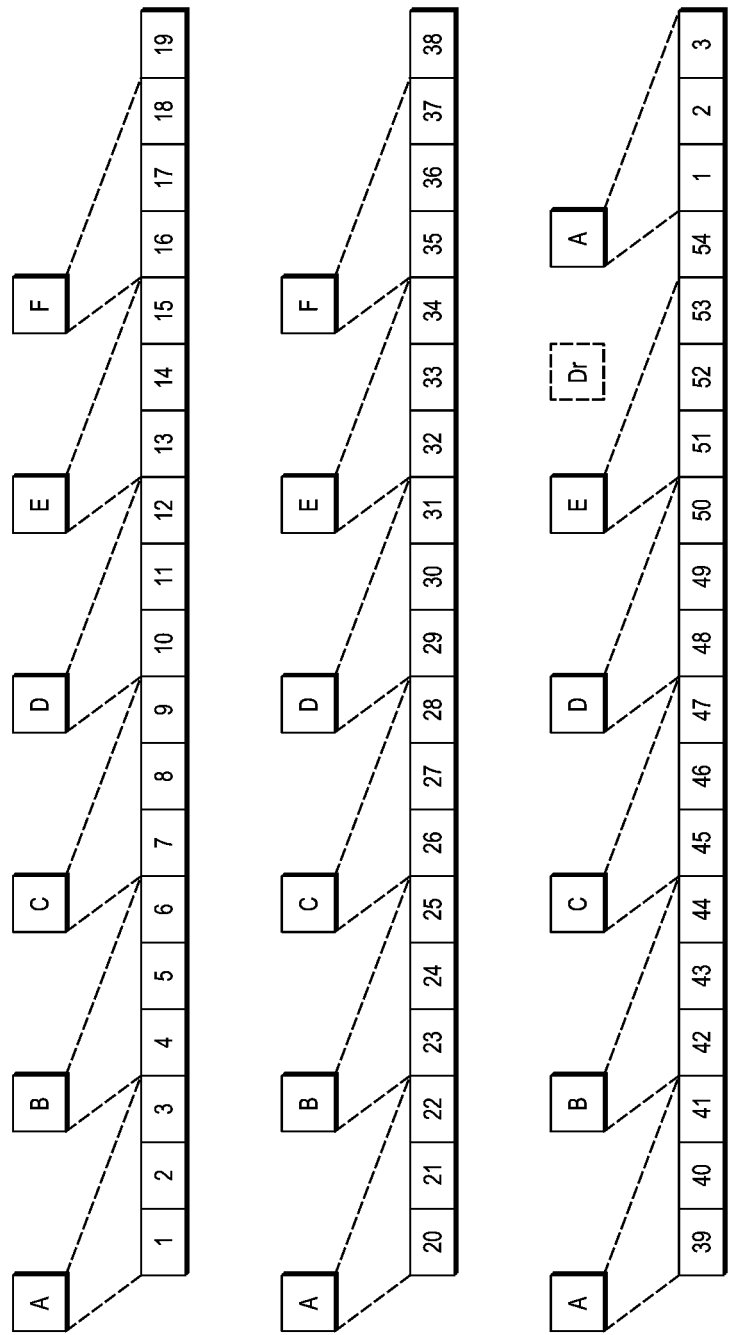
FIG. 6 illustrates a method for receiving the TDMA call signal in accordance with an embodiment of the present disclosure.

FIG. 6 illustrates one exemplary embodiment for receiving a call that is transmitted using the methods shown in FIGS. 4 and 5. When each burst A-F is received, the receiving device extracts the information frames from each received burst in order to provide the encoded call information to the user. Thus, as shown in FIG. 6, information frames 1-3 are extracted from burst A in superframe 1, information frames 4-6 are then extracted from burst B in superframe 1, and so on.

At the end of each superframe, to account for the discarded information frame, the receiving device plays a mitigated information frame before beginning the next superframe. Thus, as shown in FIG. 6, after receiving information frames 1-18 in superframe 1, the receiving device plays a mitigated information frame 19. Similarly, after receiving information frames 20-37 for superframe 2, the receiving device plays a mitigated information frame 38; and after receiving information frames 39-53, the receiving device plays a mitigated information frame 54. This process is then repeated for each series of three superframes.

The mitigated information frames may be generated using various techniques known in the art. For example, in one embodiment, a mitigated information frame may be generated by interpolating between the information frames received immediately before and after the time when a mitigate information frame is to be inserted. In another embodiment, a mitigated information frame may be generated by repeating the prior information frame. In another embodiment, a mitigated information frame may be generated by playing the subsequently received information frame twice. In yet another embodiment, the mitigated information frame may simply be a muted frame.

Figure 7A:
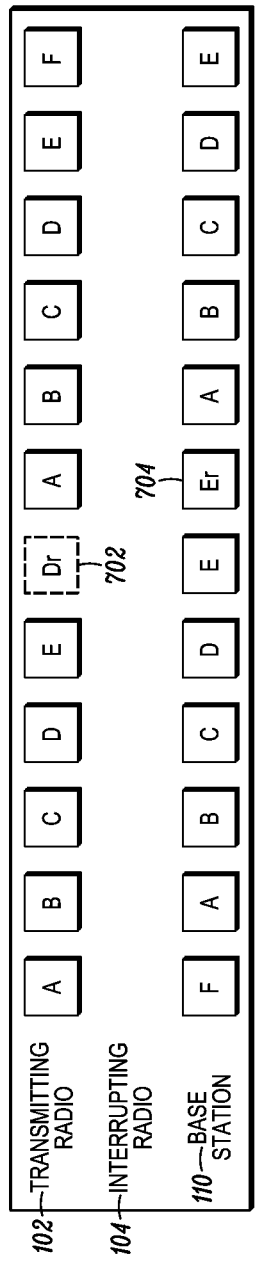
FIG. 7 illustrates a method for interrupting a transmitting device operating in repeater mode in accordance with an embodiment of the present disclosure.
Figure 7B:
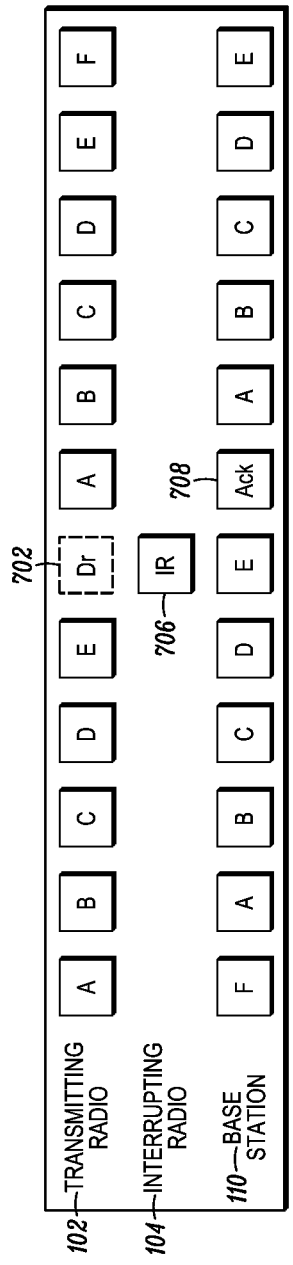
Figure 7C:
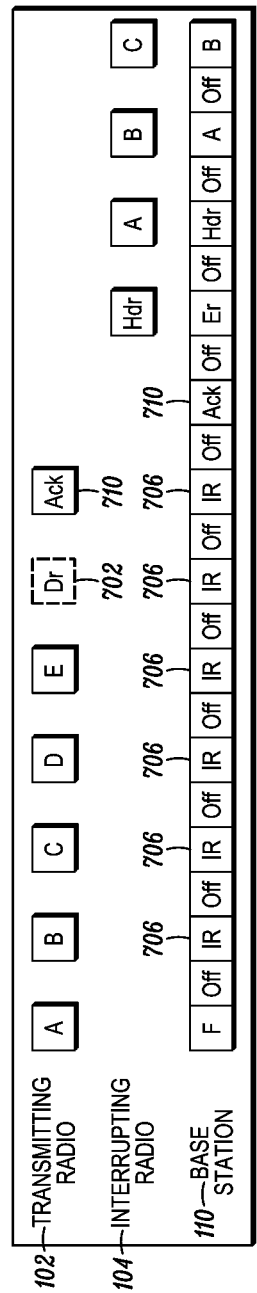

FIGS. 7a-7c illustrate one exemplary embodiment of a method by which a non-transmitting device may interrupt a transmitting device in accordance with the present disclosure. More particularly, FIGS. 7a-7c describe an embodiment in which a non-transmitting device (i.e., an "interrupting device") needs to interrupt a transmitting device that is transmitting a call via a base station 110 in repeater mode. As an example, let us assume that in the communication system 100 of FIG. 1, radio 102 is the transmitting device and radio 104 is the interrupting device.

The various blocks shown in FIGS. 7a-7c indicate transmission of the various bursts and signals from the respective communication devices. Thus, the transmitting device 102 is illustrated transmitting a series of TDMA bursts to a base station 110 on a first TDMA time slot (i.e. the "inbound channel link"). Each burst is received by the base station 110 and retransmitted during a subsequent burst period to other communication devices on another TDMA time slot (i.e., the "outbound channel link"). Thus, burst "A" is transmitted from the transmitting device 102, received by the base station 110, and retransmitted during the next available burst period on the outbound channel link. The same process is then performed for each subsequent burst. As a result, in this embodiment, bursts are typically transmitted to other communication devices in the system one burst period after the burst has been transmitted from the transmitting device.

As discussed above, the transmitting device 102 is also configured to periodically drop a burst during transmission. During an open burst period 702, when the base station 110 does not receive a burst from the transmitting device 102, the base station transmits an erasure burst 404 on the following burst period of the outbound channel link to indicate that no call information was received from the transmitting device. The erasure burst 404 is typically comprised of three erasure information frames. The structure and function of an erasure information frame that is used for an erasure burst is well known in the art and is therefore not discussed any further herein.

Turning to FIG. 7b, if an interrupting device 104 has determined that the transmitting device 102 is to be interrupted, the interrupting device 104 transmits, during an open burst period 702, an interrupt request 706 on the inbound channel link. In one embodiment, the interrupt request 706 may be sent automatically upon a user keying a call at the interrupting device 706. However, the interrupting device may also be configured with a transmitter interrupt button to permit the user of the interrupting device to manually request transmission of the interrupt signal. Upon transmitting an interrupt request, the interrupting device 104 may also be configured to provide a user perceivable notification to the user to indicate that the interrupt request 706 has been sent. The user perceivable notification may be an audible signal, a visual cue, or any other type of notification that can be perceived by the user.

There are various scenarios where it may be desirable to interrupt the transmitting device. For example, it may be desirable to interrupt a transmitting device if another device needs to transmit an emergency call. It may also be desirable to interrupt a transmitting device if a higher-priority device needs to initiate a call. It may also be desirable to interrupt a transmitting device if a non-transmitting device needs to send an urgent data message or an event indicator to the transmitting device. If devices in the communication system are configured to permit remote monitoring (i.e., allowing one device to remotely activate the microphone of another device), it may also be desirable to also remotely interrupt or dekey the device being monitored.

Of course, these are provided merely as examples, and it should be understood that there may be numerous other scenarios where it would be desirable to interrupt the transmitting device. For instance, although the illustrated interrupting device in FIGS. 7a-7c is a radio, it should be understood that the interrupting device may be any other device. As an example, the base station may be configured to transmit an interrupt request to a transmitting device upon receiving a command from a console site or other device to interrupt the transmitting device. It should also be understood that the interrupt request may be configured to cause the transmitting device to either completely cease transmitting or to pause for a certain amount of time.

The base station 110, after receiving the interrupt request 706, may generate and transmit an acknowledgement signal 708 to the interrupting device 104 on the outbound channel link to indicate that the interrupt request 706 had been received. In one exemplary embodiment, the acknowledgement signal 708 may be transmitted within an embedded signaling field of an erasure burst, although other message structures may also be used.

Turning to FIG. 7c, after transmitting the acknowledgment signal 708, the base station 110 begins broadcasting the interrupt request 706 on the outbound channel link during the next superframe in which the transmitting device is expected to drop a burst. In the illustrated embodiment, the interrupt request 706 is broadcast during each burst period (i.e., A-F) of the superframe in which an open burst period 402 is expected (e.g., a superframe 3 in FIG. 4). Since the transmitting device 102 switches to a receive mode during the open burst period 402, the transmitting device 102 receives the interrupt request 706 during this open burst period 402. Any other device listening to the call also receives the interrupt request 706, thus indicating to each such device that the transmitting device is about to be interrupted.

Of course, it will be understood that the number of times that the interrupt request is actually transmitted by the base station 110 is a matter of design choice so long as at least one such transmission coincides with the open burst period 702. For example, increasing the number of times an interrupt request is transmitted increases the likelihood that the interrupt request will be received by devices listening to the call, while decreasing the number of time an interrupt request is transmitted decreases the amount of the transmitted call that is truncated by the base station 110.

After receiving the interrupt request 706, the transmitting device 102 takes an appropriate action based the received interrupt request. In the embodiment illustrated in FIG. 7c, the transmitting device 102 send an acknowledgement message 710 on the inbound channel link during the next available burst period and then ceases transmitting. However, the transmitting device 102 may also be configured to take other actions depending on the interrupt request received. For example, the transmitting device may be configured to pause transmission for a certain amount of time. The transmitting device 102 may also be configured to provide a user perceivable notification to the user to indicate that an interrupt request has been received.

The base station 110, upon receiving the acknowledgment message 710, stops broadcasting the interrupt request, and transmits the acknowledgment message 710 on the outbound channel link to the interrupting device 104. Once the interrupting device 104 receives the acknowledgement message 710, the interrupting device 104 begins transmitting on the inbound channel link. If the call is a voice call, the interrupting device may also be configured to provide a user perceivable notification to the user to indicate that the interrupt request has been acknowledged and to inform the user that they may begin speaking.

Although not shown in FIG. 7c, the transmitting device 102 may also be configured to transmit multiple instances of an acknowledgement message 710 after receiving an interrupt request 706 to decrease the risk of the acknowledgement message 710 being lost. In another embodiment, the transmitting device 102 may also be configured to continue transmitting the acknowledgement message 710 until it has been properly received by the base station 110. For example, the transmitting device 102 may be configured to alternate between transmitting an acknowledgement message 710 and listening to the outbound channel link until the transmitting device 102 determines that the base station 110 is no longer broadcasting the interrupt request 706.

Figure 8:
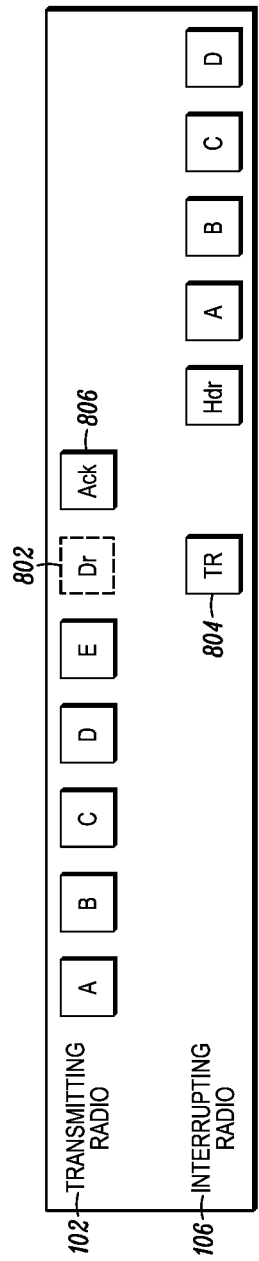
FIG. 8 illustrates a method for interrupting a transmitting device operating in direct mode in accordance with an embodiment of the present disclosure.
Figure 9:
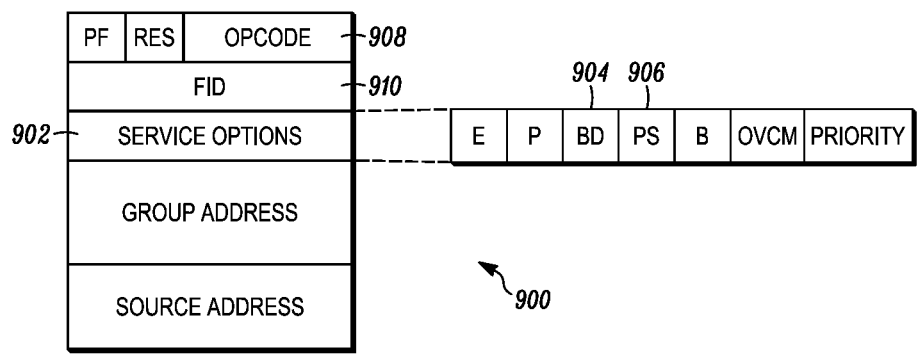
FIG. 9 illustrates an example of a link control message in accordance with an embodiment of the present disclosure.

FIG. 8 illustrates another exemplary embodiment of the present disclosure in which a transmitting device is operating in direct mode. In this embodiment, each burst is transmitted directly from the transmitting device 102 to each device listening to the call. In FIG. 8, let us assume that in the communication system 100 of FIG. 1, radio 102 is the transmitting device and radio 106 is the interrupting device. Similarly, the transmitting device 102 is also configured to periodically drop a burst during transmission.

In this embodiment, if an interrupting device 106 has determined that the transmitting device 102 is to be interrupted, the interrupting device 106 transmits, during an open burst period 802, an interrupt request 804 to the transmitting device 102.

After receiving the interrupt request, the transmitting device 102 takes appropriate actions. In the embodiment shown in FIG. 8, this includes transmitting to the interrupting device 106 an acknowledgement message 806 during the next available burst period and then ceasing transmission. Upon receiving the acknowledgment message 806, the interrupting device 106 begins transmitting.

As in the embodiment described in FIGS. 7a-7c, the transmitting device 102 in FIG. 8 may also be configured to provide a user perceivable notification upon receiving an interrupt request, and the interrupting device may be configured to provide a user receivable notification upon sending the interrupt request and/or receiving acknowledgement of the interrupt request from the transmitting device. The transmitting device may also be configured to transmit the acknowledgement message multiple time to increase the chance of it being received, or to continue transmitting the acknowledgement message until it is determined that the interrupting device has received the acknowledgement message and begun transmitting.

Figure 10:
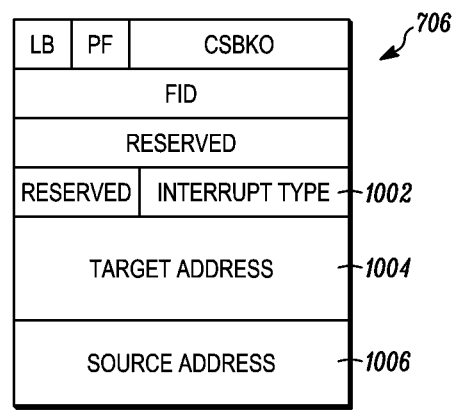
FIG. 10 illustrates an example of an interrupt request in accordance with an embodiment of the present disclosure.

FIG. 10 illustrates one exemplary embodiment of an interrupt request 706 that may be utilized in TDMA communication system described above. In this embodiment, the interrupt request 706 may in the form of a Control Signaling Block ("CSBK") message. As shown in FIG. 10, the interrupt request 706 includes an interrupt type information element 1002. The interrupt type information element 1002 may be utilized to indicate the purpose of the interrupt request. For example, in one embodiment, the interrupt type information element 1002 may be comprised of 5 bits in which the value 00001 indicates interruption from a higher priority call, 00010 indicates interruption of by an emergency call, and 00011 indicates interruption of a device that is being remotely monitored. Of course, additional types of interrupt requests may also be provided for and any values may be used for each type. The interrupt type information element 1002 may also be configured to indicate whether the transmitting device is to cease transmitting or simply pause for a certain amount of time.

The interrupt request 706 further includes a target address information element 1004 and a source address information element 1006. When the interrupt request 706 is sent from an interrupting device, the target address information element 1004 identifies the address of the transmitting device to be interrupted, and the source address information element 1006 identifies the device that is requesting access to the channel. The remaining information elements shown in the interrupt request are well known information elements utilized in CSBK signals and are therefore not discussed in any further detail herein.

Figure 11:
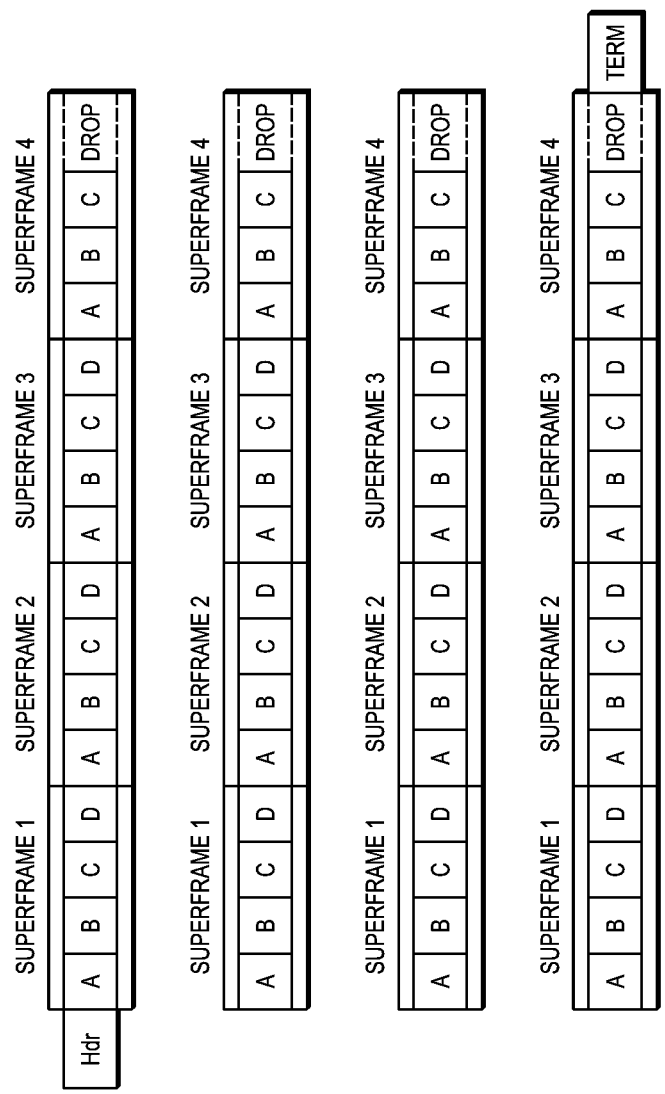
FIG. 11 illustrates a method for transmitting a FDMA call signal in accordance with an embodiment of the present disclosure.
Figure 12:
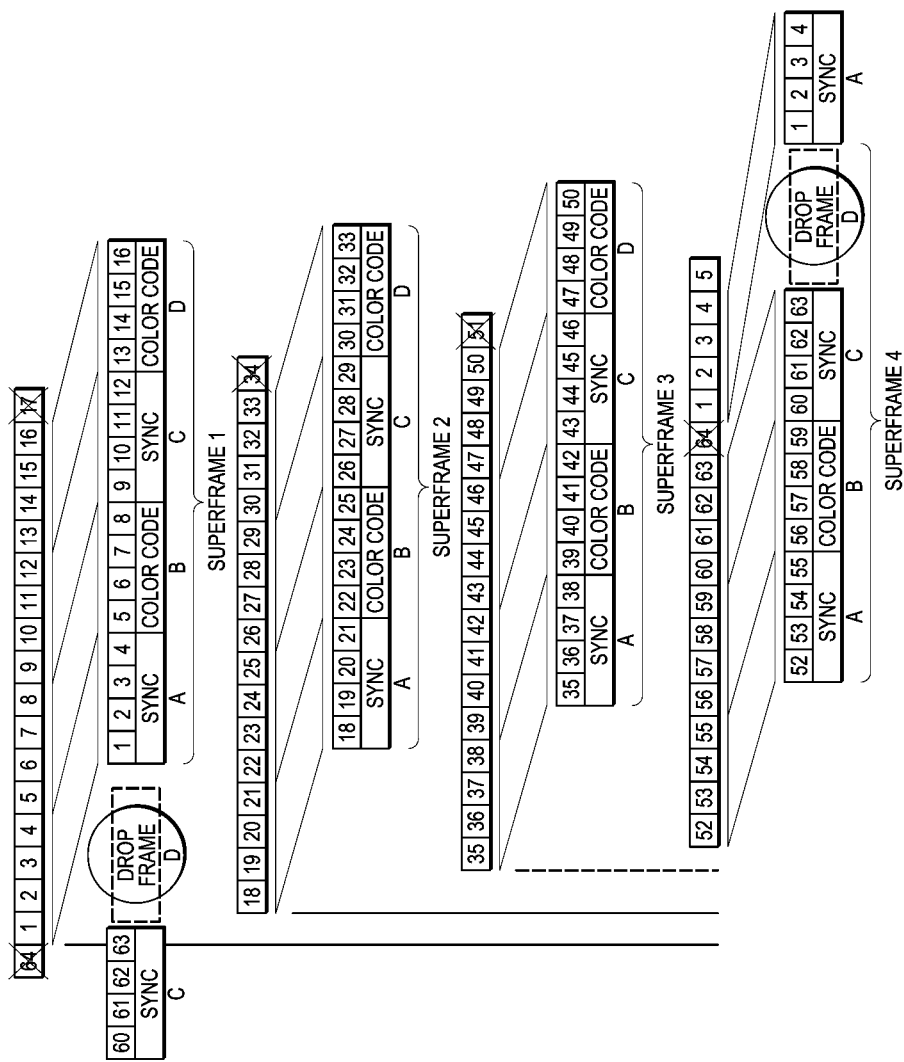
FIG. 12 illustrates a method for generating the FDMA call signal in accordance with an embodiment of the present disclosure.
Figure 13:
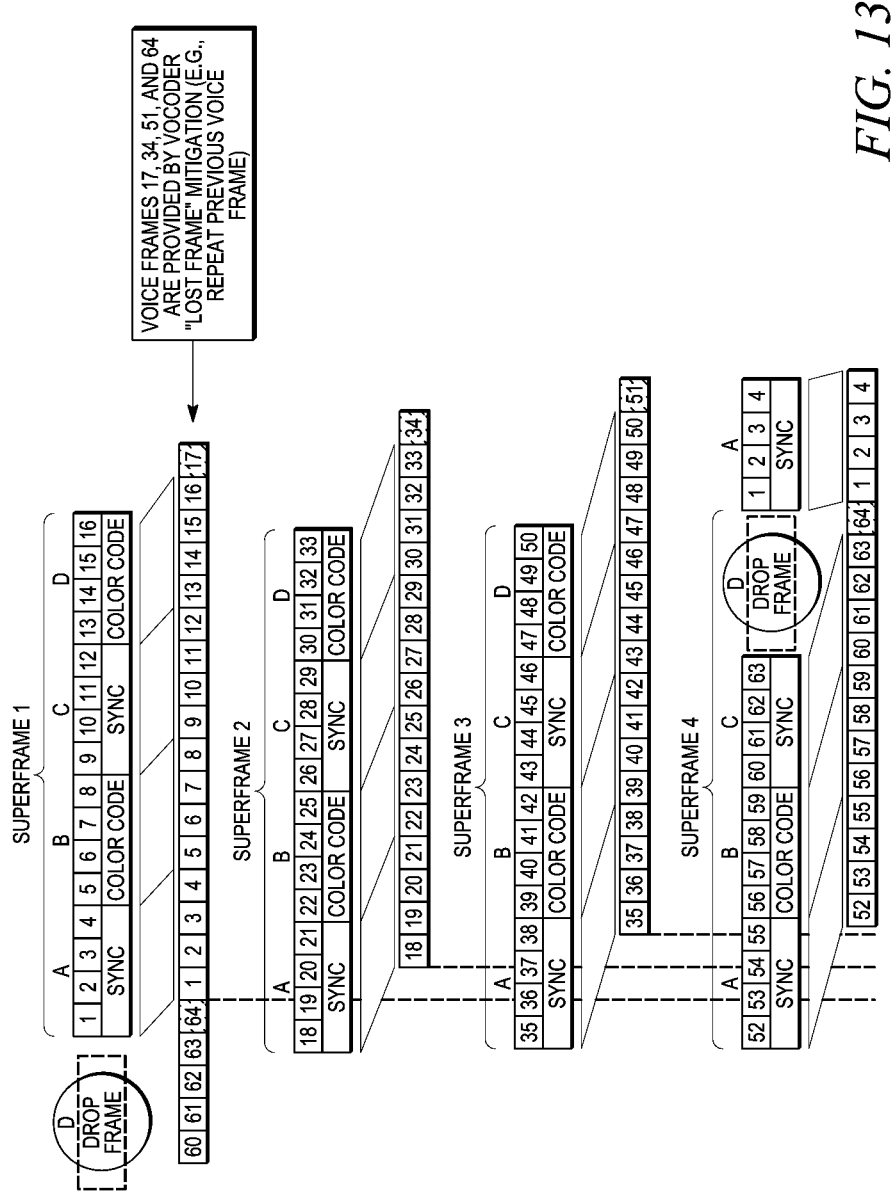
FIG. 13 illustrates a method for receiving the FDMA call signal in accordance with an embodiment of the present disclosure Skilled artisans will appreciate that elements in the figures are illustrated for simplicity and clarity and have not necessarily been drawn to scale. For example, the dimensions and/or relative positioning of some of the elements in the figures may be exaggerated relative to other elements to help improve the understanding of various embodiments of the present disclosure. Also, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions with respect to their corresponding respective areas of inquiry and study except where specific meaning have otherwise been set forth herein.

Further advantages and modifications of the above described system and method will readily occur to those skilled in the art. For example, while the present disclosure has been described with regards to an exemplary TDMA system, it is understood that the present disclosure is equally applicable any other type of system that transmits calls as a series of channel frames. For instance, the TDMA call signal described above in FIGS. 4, 5, and 6 could easily be based upon the air interface protocol described in the ETSI TS 102 361 standard (ETSI-DMR standard). In yet another embodiment of the present disclosure, an FDMA call signal described below in FIGS. 11, 12 and 13 could easily be based upon the air interface protocol described in the ETSI TS 102 490 standard (ETSI-dPMR standard) and still remain within the spirit and scope of the present disclosure. For example, let us now briefly illustrate some examples of an FDMA system and highlight the differences between the FDMA call signal and the TDMA call signal as described above. In an ETSI-dPMR FDMA system, as illustrated in FIG. 11, FDMA call signals are typically separated into superframes each having four payload frames A-D, with each payload frame having four information frames. In an ETSI-dPMR FDMA system, payload frames may be periodically dropped to create open payload frame periods. Thus, in one exemplary embodiment, sufficient open payload frame periods may be produced by dropping a payload frame every fourth superframe in accordance with an embodiment of the present disclosure. In other words, an FDMA call signal having superframes comprising four payload frames, one payload frame from every fourth superframe is not transmitted in order to provide an interrupt opportunity for another device. To minimize the impact on call quality, an information frame may also be discarded every 16 information frames so that only one information frame is discarded during each superframe. Thus, FIG. 12 illustrates a method for generating the FDMA call signal with payload frames comprising four information frames and one information frame of every sixteen information frames is discarded in such a way to allow every sixteenth payload frame to not be transmitted in order to provide an interrupt opportunity for another device in accordance with an embodiment of the present disclosure. Of course, as with the TDMA embodiment described above, the rate of dropped payload frames and/or the selected information frames to be discarded may be altered. Additionally, FIG. 13 illustrates a method for receiving an FDMA call signal with payload frames comprising four information frames and one mitigated information frame is inserted after every sixteen received information frames in accordance with an embodiment of the present disclosure. It should be readily apparent to those skilled in the art that other embodiments are possible which employ different channel frame dropping rates and different information frame dropping rates while using FDMA call signals, TDMA call signals, or other types of call signal and still remain within the spirit and scope of the present disclosure.

The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure cover all such modifications and variations provided they come within the scope of the following claims and their equivalents.

What is claimed is:

1. A method for interrupting a transmitting device transmitting a call from a first device to one or more other devices via a base station in a communication system, the method comprising:
   a first device encoding call information of a call to be transmitted into a series of channel frames;
   the first device operating in a transmitting mode and transmitting the call on a first communication channel between the first device and the base station via the series of channel frames, and the first device inserting a plurality of open channel frame periods on to the first communication channel during transmission of the call by selectively dropping, instead of transmitting, a corresponding predetermined plurality of the channel frames or portions of the channel frames;
   the first device switching to a receiving mode during one of the inserted open channel frame periods and determining, while in the receiving mode, whether an interrupt request has been transmitted from a second device to the repeater and has subsequently been repeated on a second communication channel by the base station and received at the first device; and
   responsive to the first device determining that an interrupt request has been transmitted from the second device and has been received at the first device via the base station, as a function of the interrupt request, at least one of:
      the first device ceasing transmitting of the call on the first communication channel; and
      the first device pausing transmission of the call on the first communication channel for a predetermined period of time.

2. The method of claim 1, wherein:
   the call is transmitted as a series of superframes, each superframe having one or more channel frames,
   the plurality of open channel frame periods are provided periodically during transmission of the call, and
   an open channel frame period is provided once every x superframes transmitted during the call, wherein x is an integer greater than or equal to one.

3. The method of claim 2, wherein each of the series of channel frames is comprised of a predetermined number of information frames and wherein the method further includes, in the transmitting mode:
   encoding a series of information frames;
   generating the series of channel frames from the series of information frames; and
   periodically discarding a particular information frame while generating the series of channel frames.

4. The method of claim 3, wherein one information frame is discarded after transmission of each superframe.

5. The method of claim 1, further including the first device transmitting an acknowledgment message acknowledging receipt of the interrupt request to the base station after receiving the interrupt request.

6. The method of claim 1, wherein the communication system is one of the following:
   a time division multiple access (TDMA) system and the call is transmitted as a series of bursts; and
   a frequency division multiple access (FDMA) system and the call is transmitted as a series of payload frames.

7. The method of claim 1, wherein the first device is a radio and the second device is one of a console site and another radio.

8. The method of claim 1, further comprising the first device embedding an indication in a channel frame, prior to each open channel frame period, of when the next open channel frame period will occur.

9. The system of claim 1, wherein the base station is further configured to receive an acknowledgment of a receipt of the repeated interrupt request from the first device, and responsively transmit a further acknowledgment to the second device.

10. The method of claim 1, wherein the at least one of the dropped channel frames or portions of the channel frames includes call audio data.

11. The method of claim 1, wherein the at least one of the dropped channel frames or portions of the channel frames includes call control information.

12. A method for interrupting a transmitting device transmitting a call from a second device to one or more other devices, including a first device, via a base station in a communication system, the method comprising:
the first device operating in a receiving mode and receiving a first call on a first communication channel between the first device and the base station via a series of channel frames, and the first device receiving erasure bursts inserted by the base station on the first communication channel during corresponding open channel frame periods inserted on to a second communication channel between the base station and the second device during transmission of the call by the second device selectively dropping, instead of transmitting, a corresponding predetermined plurality of the channel frames or portions of the channel frames, the erasure bursts indicating to the first device that no call information was received at the base station from the second device;
the first device mitigating the dropped corresponding predetermined plurality of the channel frames or portions of the channel frames caused by the second device's insertion of the open channel frame periods;
the first device determining that the first call being transmitted by the second device should be interrupted;
the first device switching from operating in the receive mode to operating in a transmit mode during one of the open channel frame periods;
the first device, while in the transmit mode and during the one of the open channel frame periods, transmitting an interrupt request to the base station on the second communication channel for forwarding to the second device via the base station during a subsequent open channel frame period, the interrupt request instructing the second device to one of cease transmitting of the call on the second communication channel and pause transmitting of the call on the second communication channel for a predetermined period of time; and
after transmitting the interrupt request, the first device transmitting a second call on the second communication channel.

13. The method of claim 12, further including the first device determining whether an acknowledgment of the interrupt request has been received from the second device via the base station, and the first device transitioning from the receiving mode to the transmitting mode and transmitting the second call responsive to receiving the acknowledgement.

14. The method of claim 12, wherein the first device is a radio and the first device waits to receive an acknowledgment from the base station that the base station has successfully interrupted the second device before transmitting the second call on the second communication channel.

15. The method of claim 12, further comprising determining a next open channel frame period from information embedded in one or more received channel frames of the call; wherein the step of switching the first device from operating in the receive mode to operating in the transmit mode is executed during the determined next open channel frame period.

16. The method of claim 12, wherein the second device is a radio and the first device is one of a console site and another radio.

17. A system for interrupting a transmitting device transmitting a call from a first device to one or more other devices via a base station in a communication system comprising:
a first device configured to:
encode call information of a call to be transmitted into a series of channel frames;
operate in a transmit mode and transmit a first call on a first communication channel between the first device and the base station via the series of channel frames;
insert a plurality of open channel frame periods on to the first communication channel during transmission of the first call by selectively dropping, instead of transmitting, a corresponding predetermined plurality of the channel frames or portions of the channel frames;
switch to a receive mode during at least one of the inserted plurality of open channel frame periods; and
receive a call interrupt request on a second communication channel, originally transmitted from a second device and repeated by the base station on the second communication channel, and, as a function of the interrupt request, cease transmitting the call or pause transmitting the call for a predetermined amount of time;
a second device configured to:
operate in a receive mode and receive the first call on the second communication channel between the second device and the base station, including receiving erasure bursts on the second communication channel during repeating transmission of the open channel frame periods to indicate to the second device by the base station that no call information was received at the base station from the first device;
mitigate the dropped corresponding predetermined plurality of the channel frames or portions of the channel frames caused by the first device's insertion of the open channel frame periods;
determine that the first call being transmitted by the first device should be interrupted and responsively switch from the receive mode to a transmit mode during one of the open channel frame periods inserted by the first device and transmit the call interrupt request to the base station on the first communication channel for forwarding to the first device via the base station during a subsequent open channel frame period, the interrupt request instructing the first device to cease transmitting of the call on the first communication channel; and
after transmitting the call interrupt request, transmit a second call on the first communication channel.

18. The system of claim 17, wherein the first device is further configured to embed an indication in a channel frame, prior to each open channel frame period, of when the next open channel frame period will occur.

19. The system of claim 17, wherein the at least one of the dropped channel frames or portions of the channel frames includes call audio data, and wherein the second device is configured to mitigate the dropped call audio data.

20. The system of claim 1, wherein the first device is a radio and the second device is one of a console site and another radio.

* * * * *